2,911,223

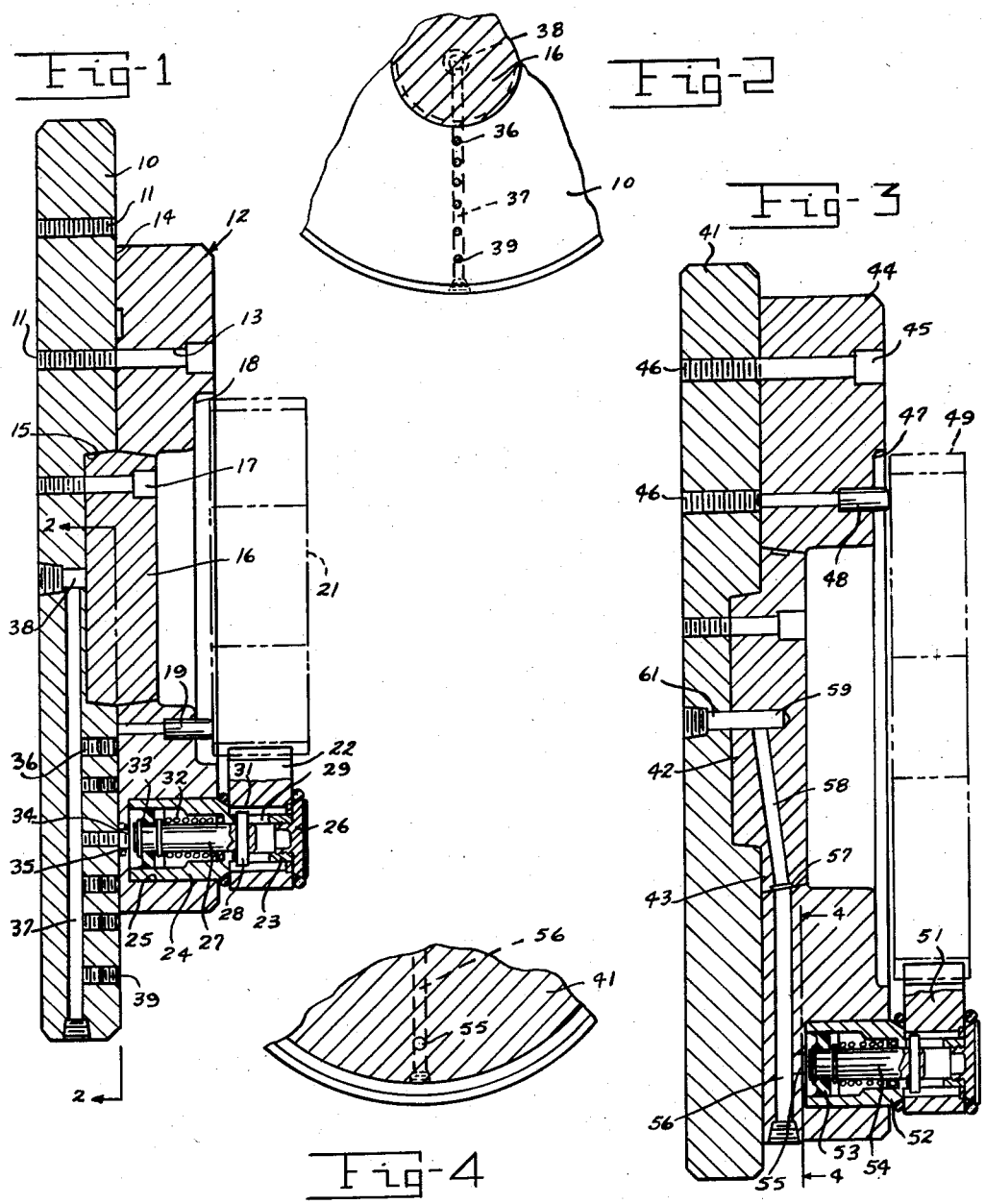
Nov. 3, 1959 — J. O. GARRISON ET AL — 2,911,223
UNIVERSAL MOUNTING FOR AIR OPERATED CHUCK
Filed Feb. 3, 1958
INVENTORS
JAMES O. GARRISON
DAVID D. WALKER
BY Tom Walker
ATTORNEY United States Patent Office 2,911,223
Patented Nov. 3, 1959

UNIVERSAL MOUNTING FOR AIR OPERATED CHUCK

James O. Garrison and David D. Walker, Dayton, Ohio, assignors to Garrison Machine Works, Inc., Dayton, Ohio, a corporation of Ohio Application February 3, 1958, Serial No. 712,867

10 Claims. (Cl. 279—4)

This invention relates to chucks, particularly to chucks having jaws movable by fluid pressure to work gripping and releasing positions, and has especial reference to chucks as described which are adaptable for use with work pieces of different size and shape and which need not be completely replaced in changing from operations upon a work piece of one configuration to one of another.

Chucks conventionally are mounted as an accessory upon a machine tool or the like to hold or to chuck a work piece while grinding, facing or other machine operations are performed thereon. In the interest of accuracy in the machining operations, the installation of the chuck upon the machine tool requires precision adjustments and is in other respects a time consuming operation calling for the exercise of care and skill.

The object of the invention is to simplify the construction as well as the means and mode of operation of fluid actuated chucks, whereby such chucks may not only be economically manufactured, but will be more efficient and satisfactory in use, adaptable to a wide variety of applications, and be unlikely to get out of order.

It is a further object of the present invention to avoid the necessity for completely replacing a chuck when changing from one size or kind of work to another. Thus, it is contemplated to make an initial precision installation of a base portion of the chuck upon the tool and to interchange upon such base plate selected rings carrying the movable chuck jaws which grip and release the work, which rings may be of different size and may be differently mounted upon the base plate in a rotary sense.

Another object of the invention is to provide for quick and accurate replacement of one ring with another upon the base plate, a feature of the invention in this connection residing in the use of pilot means, which may itself be replaceable to accommodate different series of rings, to guide and locate a ring upon the base plate.

Another object of the invention is to provide for fluid pressure operation of the chuck jaws, in a chuck of the kind described, utilizing means universal to different sizes of rings and different rotary positions of adjustment of the ring to connect a supply inlet in the base plate to the individual chuck jaws to conduct pressure fluid thereto.

A further object of the invention is to provide a fluid operated chuck possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, Fig. 1 is a view in longitudinal section of a gear chuck in accordance with a first illustrated embodiment of the invention;

Fig. 2 is a fragmentary view in front elevation of the base plate which serves as a mounting for the jaw carrying ring, being taken substantially along the line 2—2 of Fig. 1;

Fig. 3 is a view similar to Fig. 1, showing a second illustrated form of the invention; and Fig. 4 is a fragmentary view through the chuck jaw carrying ring, being taken substantially along the line 4—4 of Fig. 3.

Like parts are indicated by similar characters of reference throughout the several views.

Referring first to the embodiment shown in Figs. 1 and 2, a chuck in accordance with this form of the invention comprises a base plate 10 adapted in a manner not here shown to be precision installed upon a machine tool or the like in a substantially permanent manner. The plate 10 is formed with a plurality of radially spaced apart circular series of openings 11 (in the present instance two) which are selectively used for the attachment to the base plate of a chuck jaw mounting ring 12. Thus, the mounting ring 12 has a circular series of through openings 13 adapted to receive a bolt for threaded engagement with one or another of the openings 11 in the base plate. In accordance with the concept of the instant invention, the mounting rings 12 are provided in sizes in which their bolt openings 13 register with one or another of the circular series of openings 11, depending upon the size of the mounting ring. The openings 11 thus are selectively used in accordance with the diameter of the mounting ring 12. The base plate 10 is formed with an outer face 14 providing a seat for the ring 12. Centrally disposed in the surface 14 is a recess 15 to receive a pilot portion 16 which is detachably secured to the base plate 10, as by bolts 17. A part of the pilot portion 16 is installed in the recess 15 while another part thereof projects through and above the surface 14 of the plate 10 and serves as a guide and locating means for the mounting ring 12. Corresponding surfaces on the projecting part of pilot portion 16 and on the inner periphery of the ring 12 have a complementary tapering formation and the parts are adapted to interfit whereby substantially to lock the ring 12 from lateral motion and to hold it accurately in place to be bolted to the plate 10. Thus, in mounting a ring 12 upon the plate 10 it is necessary merely to place the inner periphery of the ring into telescoping relation with the pilot portion 16 and then to advance the ring to a seat upon the plate 10. The complementary formations upon the ring and pilot portion serve automatically to center the ring in response to such motion, so that without the need for special skill the ring 12 is accurately positioned and is so held while the bolts holding it to the plate 10 are installed and tightened.

The outer surface of the ring 12 is formed with a recess 18 into which projects a series of supporting pins or rests 19 for a work piece 21. The latter, such as a gear having peripheral teeth, rests on or abuts the pins 19 and is gripped or held to the chuck by a series of chuck jaws 22 (one shown) carried in a circular series upon the ring 12. The jaws 22 and the supporting and operating means therefor are in the illustrated instance of a conventional kind and do not per se form a part of the present invention. Briefly considered, each jaw 22 is in the form of an arm having at one end thereof teeth to engage the teeth of the gear and rotatably mounted at its other end upon a hollow pivot stud 23. The latter has a piston-like portion 24 received in a recess 25 in the ring 12 and at its opposite end is closed by a cap assembly 26. A rod 27 is arranged for longitudinal sliding movement within the member 23 and is provided with a cross pin 28 which extends through a longitudinal slot 29 in the bushing or stud 23 into engagement with inclined cam faces 31 on the jaw 22. An axial reciprocating motion of the rod 27 is effective, through the described connection, to effect an oscillating movement of the jaw 22. A spring 32 urges the rod 27 inwardly or to the left as shown in Fig. 1 which causes the jaw 22 normally to occupy one of its extreme operating positions, which may be a gripping position relatively to the work, or a released position relatively thereto. Motion of the rod in the opposite direction is effected by pressure fluid admitted to the interior of the piston-like portion 24 of the stud 23 through the open inner end thereof by way of the bottom of the recess 25. A piston 33 on the rod 27 confines the admitted pressure fluid to the inner end or bottom of the piston portion 24 with the result that a rising pressure in the chamber defined thereby serves to force the rod 27 axially outward and to move the jaw 22 in a direction opposed to that in which it is urged by the spring 32. Upon a release of the applied fluid pressure forces, the spring 32 is enabled to restore the jaw to its first described position.

The admission of fluid under pressure to the recess 25 is by way of a port 34 in the bottom thereof opening into an annular groove 35 in the inner face of the ring 12. It will be understood that the groove 35 is in common communication with the several recesses 25 with which the ring 12 is formed, providing mountings for the several chuck jaws which cooperate to grip and to hold the work piece 21. The groove 35 is in turn supplied with pressure fluid from the base plate 10 by one of a series of ports 36 opening through the surface 14 of the base plate and communicating at their opposite ends with a radial duct 37 in the plate. The latter connects to a central bore 38 serving as the pressure fluid inlet and adapted to be connected as through suitable tubing with a four-way valve or the like to connect the chuck alternately to a source of pressure fluid and to exhaust.

The ports 36 are arranged in a radial row, as seen also in Fig. 2, and are spaced apart distances corresponding or related to the different diameters of rings 12 which may be applied to the base plate 10. Thus, only one of the ports 36 is used at any one time, the remainder being plugged by removable screws 39 or the like. In changing from one diameter ring 12 to another, the ring is removed and the previously open port 36 is plugged and another one thereof is opened, the selection of the particular one to be opened being determined by the size of the ring 12 to be replaced upon the plate 10. When mounted upon the plate in the manner before described, the groove 35 therein registers with the selected open port 36 and the several chuck jaw operating mechanisms are connected to the fluid pressure source for operation.

It further will be understood that at least within a limited series of sizes, the rings 12 will have uniform interior diameters in order to be accommodated to a common pivot portion 16. The latter, since it is detachably mounted in the base plate 10 may also be removed and replaced with another portion of smaller or greater diameter to be adapted to a different ring 12 or series of rings. The portion of the pilot member 16 which is received within the recess 15 may also be peripherally tapered to agree with a correspondingly tapered portion of the recess for easy entry of the pilot portion into the recess and to substantially eliminate the possibility of lateral lost motion between the pilot portion and the base plate. The construction and arrangement of parts it may be seen is such as to facilitate the substitution of one mounting ring 12 for another to adapt the chuck for the chucking of work pieces of different size and shape without the need for repeating the precision installation of the chuck proper which is represented in the initial mounting of the base plate 10. In accordance with the present inventive concept, the basic installation is made only once, and the adaptation to work pieces of different descriptive properties is then made simply by removing and replacing the rings 12, an operation which can be carried out without need for the exercise of special care and skill.

The second illustrated embodiment of the invention contemplates a construction and arrangement of parts like that of Figs. 1 to 2, except for a different manner of leading the pressure fluid to the chuck jaw operating mechanisms. Thus there is provided therein a base plate 41 which is the same as the base plate 10. A pilot portion 42 is mounted therein which is like the pilot portion 16 except that it is formed with a flange part 43 which overlies the outer surface of the plate and in effect widens the pilot portion in order that it may cooperate with rings having a greater internal diameter than the ring 12 of Fig. 1. In the present instance there is mounted upon the base plate 41 a ring 44, there being bolts 45 passing through the ring 44 and into the outer ones of inner and outer sets of recesses 46. The ring 44 has an outwardly presented recess 47 into which project support pins 48 for a work piece 49. The periphery of the latter is gripped by jaws 51 which in their construction and mode of operation are identical to the jaws 22 of Fig. 1. Also similarly, the jaws 51 are mounted on tubular studs 52 like the studs 23 and having a piston 53 therein operable under a combination of fluid and spring pressures to reciprocate a rod 54 to oscillate the arms or jaws 51 through a pin in slot connection.

Pressure fluid is admitted to each chuck jaw operating device by an individual passage 55 opening into an individual duct 56 leading from the inner periphery of the ring 44. At such inner periphery, in the assembled position of the parts, the several ducts 56 communicate with an annular groove 57 in the exterior of the pilot portion 42. Passages 58 and 59 communicate the groove 57 with a pressure fluid inlet 61 in the base plate 41 corresponding to the inlet 38 of Fig. 1. Pressure fluid admitted to the inlet 61 accordingly is directed through passages 59, 58 and groove 57 simultaneously to the several ducts 56 and is so admitted to the respective piston chamber at the location of each chuck jaw in order to operate such jaws to or from gripping position. A differently selected ring 44 will have an internal diameter to match the diameter of the pilot portion 42, or a latter one thereof will be substituted to achieve such matching, so that the chuck jaws of the substituted ring will automatically be connected to the source of fluid pressure with no other connections or adjustments required to be made. Similarly, the chuck jaw operating mechanism is connected to the source of pressure in different rotative positions of the ring 44 since the groove 57 is continuous around the pilot portion 42 and is in common communication at all times with all of the ducts 56.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A chuck or like device, including a base plate for relatively permanent precision installation and having an outwardly facing substantially planar mounting surface, a chuck jaw supporting ring in flush engagement with said surface and separably attached to said plate, interengageable pilot portions on said plate and said ring guiding said ring to an accurate mounting on said plate to facilitate substitution of one ring for another on the same said plate and chuck jaws supported on said ring.

2. A chuck or like device, having replaceable portions to adapt it for work pieces of different size, including a base plate for relatively permanent precision installation and having an outwardly facing mounting surface, a chuck jaw supporting ring mounted on said surface and separably attached to said base plate, a pilot portion on said base plate engageable with the inner periphery of said ring for quick and accurate locating of the ring upon said plate, and chuck jaws supported on said ring.

3. A chuck or like device according to claim 2, characterized in that said pilot portion and said inner periphery of said ring have complementary taper formations guiding said ring to an accurate position on said plate and mating positively to preclude lateral relative shifting motion of the plate and ring.

4. A chuck or like device according to claim 2, characterized in that said pilot portion is a part separably attached to said plate, the said mounting surface of said plate having a recess with a tapering side wall receiving a part of complementary shape on said pilot portion.

5. A pressure fluid operated chuck or like device having replaceable and adjustable portions to adapt it for work pieces of different size, including a base plate for relatively permanent precision installation and having an outwardly facing mounting surface, a work piece supporting ring mounted on said surface and separably attached to said base plate for replacement and for rotary adjustment thereon, a plurality of fluid pressure operated chuck jaws mounted on said ring to move to work gripping and releasing positions, a pressure fluid supply inlet in said base plate, a fluid pressure supply passage in said ring individual to each of said chuck jaws, and means universal to different sizes of rings and different rotary positions of adjustment thereof to connect said supply inlet to said passages.

6. A pressure fluid operated chuck or like device according to claim 5, characterized in that said last named means comprises an annular groove intermediate said ring and said base plate in common communication with said passages and a radial row of fluid flow ports opening through said mounting surface of said base and in common communication with said supply inlet, the mounting of said ring on said base plate causing said groove to register with one port of said row of ports, varying with the diameter of the selected ring.

7. A pressure fluid operated chuck according to claim 5, characterized in that said last named means comprises a pilot portion installed in said base plate to locate said ring thereon, said portion having an annular groove in the periphery thereof in common communication with the said supply passages in said ring, and said portion further having a pressure fluid supply duct interconnecting said groove and said inlet.

8. A pressure fluid operated chuck in accordance with claim 5, characterized by a pilot portion seated in said mounting surface in said base plate to guide and locate said ring for accurate communication of said inlet with said supply passages.

9. A pressure fluid operated chuck or like device having replaceable and adjustable portions to adapt it for work pieces of different size and shape, including a base plate for relatively permanent precision installation and having an outwardly facing mounting surface, a work piece supporting ring mounted on said surface and separably attached to said base plate for replacement and for rotary adjustment thereon, fluid pressure operated chuck jaws mounted on said ring, means to apply fluid pressure for operation of said jaws, including supply passages in said ring individual to each of said jaws, a groove intermediate said ring and said plate in common communication with said passages, a fluid inlet in said base plate, a radially extending supply duct in said base plate communicating with said inlet, a radial row of ports opening through the said mounting surface of said plate, one of said ports registering with and communicating with said groove depending upon the diameter of the ring, and removeable plugs closing the remainder of said ports.

10. A pressure fluid operated chuck or like device having replaceable and adjustable portions to adapt it for work pieces of different size and shape, including a base plate for relatively permanent precision installation and having an outwardly facing mounting surface, a work piece supporting ring mounted on said surface and separably attached to said base plate for replacement and for rotary adjustment thereon, fluid pressure operated chuck jaws mounted on said ring, means to apply fluid pressure for operation of said jaws, including supply passages in said ring individual to each of said jaws, a pilot portion on said base plate accurately to locate said ring thereon, said pilot portion having a pressure fluid duct in common communication with the supply passages in said ring, and a pressure fluid inlet in said base plate communicating with said pressure fluid duct.

References Cited in the file of this patent
UNITED STATES PATENTS

| 2,366,979 | Obecny | Jan. 9, 1945 |
| 2,405,417 | Fruth | Aug. 6, 1946 |
| 2,688,220 | Boutell | Sept. 7, 1954 |